United States Patent
Jochim et al.

(10) Patent No.: US 12,438,728 B2
(45) Date of Patent: Oct. 7, 2025

(54) MESSAGE AUTHENTICATION SYSTEM INCLUDING A NETWORK DEVICE HAVING SECURITY PROXY SUPPORT

(71) Applicant: GM Global Technology Operations LLC, Detroit, MI (US)

(72) Inventors: Markus Jochim, Troy, MI (US); Thomas M. Forest, Macomb, MI (US); Mohamed A. Layouni, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 398 days.

(21) Appl. No.: 18/322,922

(22) Filed: May 24, 2023

(65) Prior Publication Data
US 2024/0396736 A1    Nov. 28, 2024

(51) Int. Cl.
*H04L 9/32* (2006.01)
*H04L 9/08* (2006.01)

(52) U.S. Cl.
CPC .......... *H04L 9/3242* (2013.01); *H04L 9/0825* (2013.01)

(58) Field of Classification Search
None
See application file for complete search history.

(56) References Cited

U.S. PATENT DOCUMENTS

| | | | |
|---|---|---|---|
| 7,882,247 B2 * | 2/2011 | Sturniolo | H04L 63/164 709/228 |
| 8,949,949 B1 * | 2/2015 | Sella | H04W 12/041 726/21 |
| 9,098,678 B2 * | 8/2015 | Hao | G06F 21/10 |
| 10,547,645 B1 | 1/2020 | Khokhar et al. | |
| 2008/0289025 A1 | 11/2008 | Schneider | |
| 2009/0296936 A1 * | 12/2009 | Lie | H04L 9/083 380/277 |
| 2011/0252230 A1 * | 10/2011 | Segre | H04L 63/162 713/171 |
| 2017/0359305 A1 | 12/2017 | Yin et al. | |
| 2018/0205576 A1 | 7/2018 | Morita et al. | |
| 2021/0209034 A1 | 7/2021 | Stitt et al. | |
| 2022/0286441 A1 * | 9/2022 | Kuehnel | H04L 65/75 |
| 2024/0283798 A1 | 8/2024 | Sankaran et al. | |

* cited by examiner

*Primary Examiner* — Bassam A Noaman
(74) *Attorney, Agent, or Firm* — Vivacqua Crane, PLLC

(57) ABSTRACT

A message authentication system for a network includes a private communication system including one or more private nodes in electronic communication with one another, a public communication system including one or more public nodes in electronic communication with one another, and a security proxy device that electronically connects the private communication system to the public communication system. The security proxy device includes a processing unit in electronic communication with a network device. The network device includes a security module integrated into the security proxy device, a private domain including one or more unique ports and storing one or more transmit keys for authenticating messages generated by one of the private nodes of the private communication system, and a public domain including one or more public ports.

20 Claims, 3 Drawing Sheets

MESSAGE AUTHENTICATION SYSTEM INCLUDING A NETWORK DEVICE HAVING SECURITY PROXY SUPPORT

INTRODUCTION

The present disclosure relates to a message authentication system for a network that includes a public communication system, a private communication system, and a security proxy device that provides security proxy support by authenticating messages generated by the private communication system before the messages are sent to the public communication system.

A vehicle network may be employed for exchanging messages between various smart sensors, smart actuators, and electronic control modules that are part of a vehicle. In one example, the vehicle network may include both a private communication system and a public communication system. The private communication system includes one or more private nodes, and the public communication system includes one or more public nodes. Unlike the public communication system, messages exchanged between the private nodes that are part of the private communication system do not require authentication.

In one approach, the vehicle network may include a security proxy device that authenticates messages received from the private communication system before the messages are transmitted to the public communication system. Specifically, the security proxy device includes a network device including private ports, where each private port of the network device corresponds to one of the private nodes of the private communication system. Thus, security proxy device knows which private node generated a message. The security proxy device also includes a processing unit, such as a central processing unit (CPU), and a security module. The processing unit of the security proxy device receives a message generated by one of the private nodes and forwards the messages to the security module. The security module of the security proxy device authenticates the messages generated by the private node by creating a message authentication code. The security module will then make the message generated by the private node, which now includes a message authentication code, available to the processing unit of the security proxy device. The processing unit may then retransmit the message generated by the private node, which now includes a message authentication code, over the vehicle network to one or more of the public nodes that are part of the public communication system. The public nodes may then check the authenticity of the message based on the message authentication code.

Adding authentication information to the messages received by the security proxy from one of the private nodes results in increased end-to-end latency. Moreover, the processing unit of the security proxy device is responsible for transmitting numerous messages between the security module and the network devices, which is computationally intensive. In the event the processing unit of the security proxy device is compromised by an attacker, the messages received by the processing unit may be altered in a variety of ways that are not detectable by the security module. As an example, the security module is unable to know if the compromised processing unit of the security proxy device has provided a misleading source address for a message that was not actually generated by one of the private nodes.

Thus, while vehicle networks achieve their intended purpose, there is a need in the art for an improved approach for authenticating messages received from a private communication system.

SUMMARY

According to several aspects, a message authentication system for a network is disclosed. The message authentication system includes a private communication system including one or more private nodes in electronic communication with one another, a public communication system including one or more public nodes in electronic communication with one another, where the public nodes require message authentication, and a security proxy device that electronically connects the private communication system to the public communication system, where the security proxy device includes a processing unit in electronic communication with a network device. The network device includes a security module integrated into the security proxy device. The network device includes a private domain including one or more unique ports and storing one or more transmit keys for authenticating messages generated by one of the private nodes of the private communication system, where each unique port of the private domain corresponds to one of the private nodes of the private communication system. The network device includes a public domain including one or more public ports, wherein the one or more public ports of the public domain are in electronic communication with one or more of the public nodes of the public communication system.

In another aspect, the private nodes lack support for message authentication.

In yet another aspect, the security module and a corresponding transmit key of the private domain of the network device generate a message authentication code for a message generated by one of the private nodes of the private communication system that is sent to one or more of the public nodes.

In an aspect, the private domain of the network device stores one or more receive keys, where each receive key corresponds to one of the public nodes.

In another aspect, the security module and a corresponding receive key of the network device verify a message authentication code for an incoming message generated by one of the public nodes of the public communication system that is transmitted to one or more of the private nodes.

In yet another aspect, the private domain of the network device stores a common transmit key that authenticates messages generated by any of the private nodes.

In an aspect, each public node of the public communication system includes a corresponding security module.

In another aspect, each public node of the public communication system includes a unique transmit key and receive keys, where the receive keys each correspond to one of the private nodes of the private communication system and the remaining public nodes that are part of the public communication system.

In yet another aspect, the corresponding security module and the unique transmit key that are part of a specific public node generate a message authentication code for messages sent by the specific public node.

In an aspect, the corresponding security module and a corresponding receive key that is part of the specific public node verifies message authentication codes for messages received by the specific public node.

In another aspect, the private nodes include one or more of the following: smart sensors, smart actuators, and electronic control units with input/output (I/O) interfaces that are part of a vehicle.

In yet another aspect, the public domain of the network device stores a public domain transmit key that authenticates messages generated by the public nodes that are transmitted over the network based on a hop-by-hop routing approach.

In an aspect, message authentication system for a network is disclosed. The message authentication system includes a private communication system including one or more private nodes in electronic communication with one another, a public communication system including one or more public nodes in electronic communication with one another, where the public nodes require message authentication, and where each public node of the public communication system includes a corresponding security module, and a security proxy device that electronically connects the private communication system to the public communication system. The security proxy device includes a processing unit in electronic communication with a network device. The network device includes a security module integrated into the security proxy device, a private domain including one or more unique ports and storing one or more transmit keys for authenticating messages generated by one of the private nodes of the private communication system, where each unique port of the private domain corresponds to one of the private nodes of the private communication system, where the security module and a corresponding transmit key stored by the private domain of the network device generate a message authentication code for a message generated by one of the private nodes of the private communication system that is sent to one or more of the public nodes. The security proxy includes a public domain including one or more public ports, where the one or more public ports of the public domain are in electronic communication with one or more of the public nodes of the public communication system.

In another aspect, the private domain of the network device stores one or more receive keys, where each receive key corresponds to one of the public nodes.

In yet another aspect, the security module and a corresponding receive key of the network device verify a message authentication code for an incoming message generated by one of the public nodes of the public communication system that is transmitted to one or more of the private nodes.

In an aspect, the private domain of the network device stores a common transmit key that authenticates messages generated by any of the private nodes.

In another aspect, each public node of the public communication system includes a corresponding security module.

In yet another aspect, each public node of the public communication system includes a unique transmit key and receive keys, where the receive keys each correspond to one of the private nodes of the private communication system and the remaining public nodes that are part of the public communication system.

In an aspect, the corresponding security module and the unique transmit key that are part of a specific public node generate a message authentication code for messages sent by the specific public node.

In another aspect, a message authentication system for a network is disclosed. The message authentication system includes a private communication system including one or more private nodes in electronic communication with one another, a public communication system including one or more public nodes in electronic communication with one another, where the public nodes require message authentication, and where each public node of the public communication system includes a corresponding security module, a security proxy device that electronically connects the private communication system to the public communication system. The security proxy device includes a processing unit in electronic communication with a network device. The network device includes a security module integrated into the security proxy device, a private domain including one or more unique ports and storing one or more transmit keys for authenticating messages generated by one of the private nodes of the private communication system, where each unique port of the private domain corresponds to one of the private nodes of the private communication system, where the security module and a corresponding transmit key stored by the private domain of the network device generate a message authentication code for a message generated by one of the private nodes of the private communication system that is sent to one or more of the public nodes. The network device includes a public domain including one or more public ports and storing one or more receive keys that correspond to one of the public nodes, where the one or more public ports of the public domain are in electronic communication with one or more of the public nodes of the public communication system, where the security module and a corresponding receive key of the network device verify a message authentication code for an incoming message generated by one of the public nodes of the public communication system that is transmitted to one or more of the private nodes.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
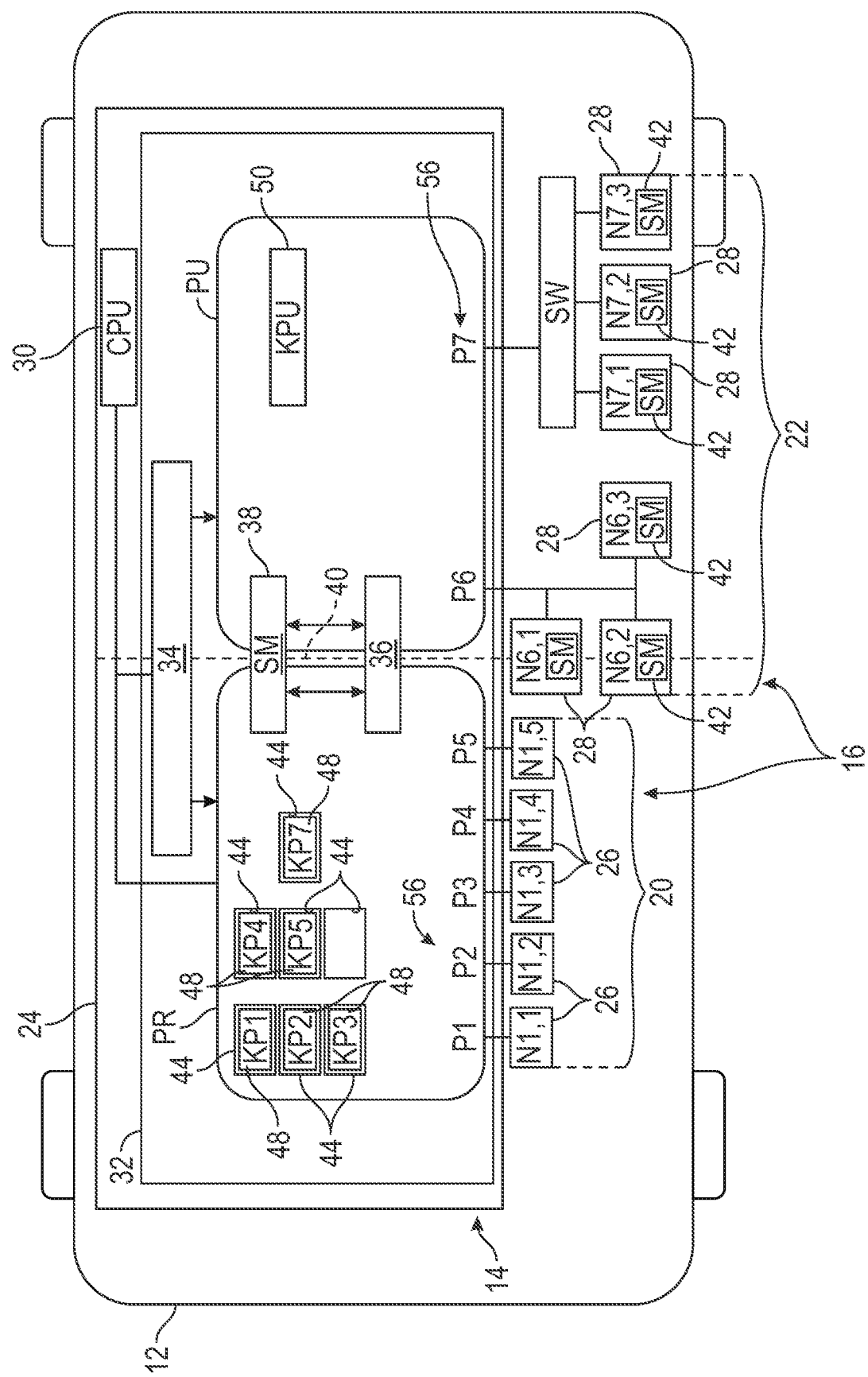
FIG. 1 is a schematic diagram of the disclosed message authentication system for a network that is part of a vehicle, where the message authentication system includes a private communication system, a public communication system, and a security proxy device, according to an exemplary embodiment.

Referring to FIG. 1, a vehicle 12 including an exemplary message authentication system 14 for a network 16 is illustrated. It is to be appreciated that the vehicle 12 may be any type of vehicle such as, but not limited to, a sedan, truck, sport utility vehicle, van, or motor home. The network 16 includes a private communication system 20 and a public communication system 22 in electronic communication with one another by a security proxy device 24. The security proxy device 24 electronically connects the private communication system 20 to the public communication system 22 based on any type of wired or wireless data transmission protocol. It is also to be appreciated that although FIG. 1 illustrates the network 16 as part of the vehicle 12, the figures are merely exemplary in nature and the message authentication system 14 is not limited to a vehicle. Indeed, the message authentication system 14 may be used in other networks that include a public and a private communication system as well such as, for example, networks for industrial automation systems.

The security proxy device 24 includes a processing unit 30 in electronic communication with a network device 32. The processing unit 30 may be, for example, a central processing unit (CPU). As explained below, the network device 32 of the security proxy device 24 provides security proxy support by authenticating messages generated by the private communication system 20 before the messages are transmitted to the public communication system 22. The network device 32 is any type of switching, routing, or forwarding device that receives and transmits messages over a network. Some examples of the network device 32 include, but are not limited to, an Ethernet switch or a router that routes and forwards messages based on internet protocol (IP) addresses, where the router includes control plane and data plane functions. It is to be appreciated that in the embodiment as shown in FIG. 1, the processing unit 30 of the security proxy device 24 does not have a role in authenticating messages that are transmitted to the private communication system 20 and the public communication system 22, which results in increased computational availability of the processing unit 30.

The private communication system 20 includes one or more private nodes 26. In one embodiment, the private nodes 26 represent devices with limited computational power and lack support for message authentication. That is, the private nodes 26 do not include a corresponding security module for generating message authentication codes. Thus, the messages generated by the private nodes 26 that are part of the private communication system 20 do not include a message authentication code. The private nodes 26 may include, for example, smart sensors, smart actuators, and electronic control units with input/output (I/O) interfaces that are part of the vehicle 12.

The network device 32 of the security proxy device 24 includes a plurality of ports 56, a private domain PR, and a public domain PU. Each port 56 of the network device 32 represents a network connection to either the private communication system 20 or the public communication system 22. The private domain PR of the network device 32 includes one or more unique ports 56, where each unique port 56 of the private domain PR corresponds to one of the private nodes 26 of the private communication system 20. Each unique port 56 of the private domain PR receives messages from a corresponding private node 26. Accordingly, the network device 32 of the security proxy device 24 knows which private node 26 generated a message. In the non-limiting embodiment as shown in FIG. 1, the private communication system 20 includes five private nodes N1,1, N1,2, N1,3, N1,4, N1,5. The private domain PR of the network device 32 includes a plurality of unique ports P1, P2, P3, P4, P5 that each correspond to one of the private nodes 26 of the private communication system 20.

The public domain PU of the network device 32 includes one or more public ports 56. The public communication system 22 includes one or more public nodes 28. The public ports 56 of the public domain PU of the network device 32 of the security proxy device 24 are in electronic communication with one or more of the public nodes 28 of the public communication system 22. Unlike the unique ports that are part of the private domain PR, the public ports 56 of the public domain PU of the network device 32 of the security proxy device 24 may be shared between more than one public node 28. In the non-limiting embodiment as shown in FIG. 1, the public communication system 22 includes six public nodes N6,1, N6,2, N6,3, N7,1, N7,2, N7,3. The three nodes N6,1 N6,2, N6,3 are in electronic communication with a corresponding public port P6 of the network device 32 of the security proxy device 24, and the remaining three public nodes N7,1, N7,2, N7,3 are in electronic communication with a corresponding public port P7 of the network device 32 of the security proxy device 24. In the embodiment as shown in FIG. 1, a switching device SW connects the public nodes N7,1, N7,2, N7,3 with the corresponding port P7. The switching device SW may be any type of switching, routing, or forwarding device that is employed in either a wired or a wireless data transmission protocol.

Unlike the private nodes 26, the public nodes 28 of the public communication system 22 require message authentication. That is, messages communicated between the public nodes 28 that are part of the public communication system 22, messages sent from one of the private nodes 26 that are part of the private communication system 20 to the public communication system 22, and messages sent from one of the public nodes 28 that are part of public communication system 22 to the private communication system 20 require a message authentication code. Each public node 28 of the public communication system 22 includes a corresponding security module 42 that is implemented in hardware or software. Each public node 28 of the public communication system 22 also stores a unique transmit key (not shown) that corresponds to a specific public node 28 and one or more receive keys (not shown). The receive keys each correspond to one of the private nodes 26 and the remaining public nodes 28 that are part of the public communication system 22 that exchange messages with the public node 28. It is to be appreciated that if one of private nodes 26 or one of the remaining public nodes 28 never sends messages to a particular public node 28, then a corresponding receive key is not required. For example, if the public node N7,1 never sends messages to the public node N6,1, then the public node N6,1 does not store the receive key corresponding to the public node N7,1. Furthermore, in the event a public node 28 receives messages based on a hop-by-hop routing approach, then the public node would store a receive key (not shown) that corresponds to a public domain PU of the network device 32. The hop-by-hop routing approach is described below.

The security module 42 and the unique transmit key stored by a specific public node 28 generate a message authentication code for messages sent by the specific public node 28. The security module 42 and a corresponding receive key that are part of the specific public node 28 may also verify message authentication codes for messages received by a specific public node 28. Each message authentication code corresponds to a unique message transmitted over the network 16. However, it is to be appreciated that in some embodiments a single message authentication code may be used to authenticate a batch of messages. For example, the public node N6,1 includes a transmit key corresponding to the public node N6,1 and eleven receive keys corresponding to the private nodes N1,1, N1,2, N1,3, N1,4, N1,5, N1,6 and the remaining public nodes N7,1, N7,2, N7,3, N6,2, N6,3. However, as mentioned above, if one of the remaining public nodes 28 does not send messages to the public node N6,1, then the public node N6,1 does not store a receive key corresponding to the public node 28. Furthermore, if the public node N6,1 receives messages based on the hop-by-hop routing approach, then the public node N6,1 would also store the receive key corresponding to the public domain PU of network device 32, since the public domain PU generates the last Message Authentication Code (MAC) on the hop-by-hop routing path, which is the MAC that will be processed by node N6,1.

The network device 32 of the security proxy device 24 includes a control plane 34, a data plane 36, and a security module 38. The control plane 34 of the network device 32 virtually defines and configures which ports 56 are part of the private domain PR and the public domain PU of the network device 32. FIG. 1 illustrates a virtual boundary 40 separating the private domain PR from the public domain PU. Specifically, a unit external to the network device 32 such as, for example, the processing unit 30 sends configuration information to the control plane 34. The configuration information indicates where the virtual boundary 40 is located. The control plane 34 then configures the private domain PR and the public domain PU based on the configuration information. In the example as shown in FIG. 1, the private domain PR includes the five private ports P1-P5 and the private domain PU includes two public ports P6 and P7. The data plane 36 performs address decoding and inspection of messages, message forwarding, security module interactions, and virtual local area network (VLAN) support.

As seen in FIG. 1, the security module 38 is integrated into the network device 32. That is, unlike the processing unit 30, the security module 38 is not separate from the network device 32. In one embodiment, the security module 38 of the network device 32 is implemented in hardware. However, it is to be appreciated that the security module 38 may be implemented in software as well. It is to be appreciated that the security module 38 of the network device 32 has knowledge of which ports 56 of the network device 32 are part of the private domain PR and which ports 56 of the network device 32 are part of the public domain PU.

In one embodiment, the private domain PR and the public domain PU of the network device 32 of the security proxy device 24 includes a tamper-resistant memory. The tamper-resistant memory of the private domain PR of the network device 32 includes a plurality of transmit key slots 44, where each transmit key slot 44 is configured to store a corresponding transmit key 48. The number of transmit key slots 44 are equal to the number of potential private ports that are part of the network device 32, and the transmit keys 48 stored in the private domain PR of the network device 32 each correspond to one of the private nodes 26. It is to be appreciated that in the non-limiting embodiment as shown in FIG. 1, the processing unit 30 is considered a private node 26 as well, thereby totaling seven potential private ports 56. Thus, FIG. 1 illustrates seven transmit key slots 44 to represent one of the potential private ports. Five of the key slots 44 store transmit keys KP1-KP5 that correspond to the private ports P1-P5, and a seventh key slot 44 stores a transmit key KP6 corresponding to the processing unit 30. Although FIG. 1 illustrates the processing unit 30 of the security proxy device 24 as a private node 26, it is to be appreciated that the processing unit 30 may be considered a public node 28 as well. Therefore, it is to be appreciated that in embodiments the processing unit 30 may exchange messages with the private nodes 26 of the private communication system 20 and the public nodes 28 of the public communication system 22.

Although FIG. 1 illustrates a plurality of transmit keys 48, in another embodiment the tamper-resistant memory of the private domain PR of the network device 32 stores a common transmit key 48 that authenticates messages generated by any of the private nodes 26 that are part of the private communication system 20. In other words, the private domain PR of the network device 32 only stores a single transmit key 48. Therefore, the private domain PR of the network device 32 includes one or more transmit keys 48 for authenticating messages generated by one of the private nodes 26 of the private communication system 20.

In the event the private domain PR of the network device 32 stores a common transmit key 48, the network device 32 introduces a node identifier to the payload of a message m transmitted by one of the private nodes 26 that are received by the network device 32 of the security proxy device 24, where the node identifier indicates the private node 26 that generated the message. The network device 32 of the security proxy device 24 also calculates a message authentication code utilizing the common transmit key 48 for the message m. The message m is received by one of the public nodes 28 that are part of the public communication system 22, where the receiving public node 28 may verify which private node 26 transmitted the message m by verifying the validity of the message authentication code and checking the node identifier.

The tamper-resistant memory of the private domain PR of the network device 32 also stores one or more of receive keys (not shown) as well, where each receive key corresponds to one of the public nodes 28 that are part of the public communication system 22. In the example as shown in FIG. 1, the private domain PR of the network device 32 stores six receive keys that each correspond to one of the public nodes N6,1, N6,2, N6,3, N7,1, N7,2, N7,3. The receive keys each verify message authentication codes from messages that are transmitted by a corresponding public node 28. As mentioned above, if one of remaining public nodes 28 never sends messages to the private communication system 20, then a corresponding receive key is not required.

The security module 38 and a corresponding transmit key 48 generate message authentication codes for messages generated by the private nodes 26 of the private communication system 20 that are sent to one or more of the public nodes 28 that are part of the public communication system 22. The security module 38 and a corresponding receive key (not shown) of the network device 32 also verify message authentication codes for incoming messages generated by the public nodes 28 that are part of the public communication system 22 that are transmitted to one or more of the private nodes 26 that are part of the private communication system 20.

In the embodiment as shown in FIG. 1, the tamper-resistant memory of the public domain PU of the network device 32 stores a public domain transmit key 50 that is labeled KPU. The public domain transmit key 50 authenticates messages generated by the public nodes 28 that are transmitted over the network 16 based on the hop-by-hop routing approach, which is described below. The tamper-resistant memory of the public domain PU of the network device 32 also includes receive keys (not shown) that each correspond to one of the public nodes 28 as well. In one embodiment, the public domain PU stores receive keys corresponding to the public nodes N6,1, N6,2, N6,3, N7,1, N7,2, N7,3. However, as mentioned above, if one of the public nodes 28 never sends messages based on the hop-by-hop routing approach, then the public domain PU does not store a corresponding receive key. It is to be appreciated that if the hop-by-hop routing approach as described below is not performed by the security proxy device 24, then the receive keys are not required.

It is to be appreciated that several approaches exist for authenticating messages transmitted over the network 16. One exemplary approach to verify messages transmitted by one of the private nodes 26 of the private communication system 20 and received by one of the public nodes 28 the public communication system 22 shall now be described. It is to be appreciated that any of the private nodes 26 may be used to send one or more unique messages to one or more of the public nodes 28 of the public communication system 22. In the present example, one of the private nodes 26 of the private communication system 20 transmits a message m to network device 32 of the security proxy device 24. It is to be appreciated that the message m includes a source address and a destination address, where the source address indicates which private node 26 generated the message m and the destination address indicates the public node 28 that the message m is intended for. In the present example, the private node N1,1 of the private communication system 20 transmits the message m to the unique port P1 of the network device 32, where the destination address is the public node N7,1 of the public communication system 22.

As mentioned above, the network device 32 of the security proxy device 24 knows the private node N1,1 generated the message m since there is a one-to-one relationship between the private nodes 26 and the unique port P1 of the network device 32. The network device 32 of the security proxy device 24 then calculates a message authentication code corresponding to the message m generated by the private node N1,1. Specifically, the security module 38 of the network device 32 of the security proxy device 24 calculates a message authentication code utilizing the transmit key KP1 that corresponds to the private node N1,1 of the private communication system 20.

The data plane 36 of the network device 32 of the security proxy device 24 then transmits the message m, which includes the message authentication code, to the public node 28 indicated by the destination address. Specifically, in the present example, the data plane 36 of the network device 32 of the security proxy device 24 transmits the message m to the public port P7 of the network device 32, where the public port P7 is in electronic communication with the public node P7,1. The security module 42 of the public node 28 indicated by the destination address (i.e., the public node P7,1) then verifies the message authentication code associated with the message m using the receive key corresponding to the private node N1,1. It is to be appreciated that integrating the security module 38 into the network device 32 of the security proxy device 24 avoids assigning message authentication tasks to the processing unit 30. As a result, the processing unit 30 of the security proxy device 24 has additional computational availability and may be used for other tasks, and latency is also reduced.

In another example, one of the private nodes 26 of the private communication system 20 transmits a message m intended for another private node 26 that is part of the private communication system 20. Specifically, in the present example, the private node N1,1 of the private communication system 20 transmits the message m including a source address and a destination address. The source address indicates that the private node N1,1 transmitted the message m and the destination address indicates the message m is intended for the private node N2,1. As mentioned above, messages transmitted over the private communication system 20 do not require authentication, and therefore the message m does not include a message authentication code. The private node N1,1 of the private communication system 20 transmits the message m to the unique port P1, where the network device 32 of the security proxy device 24 knows the private node N1,1 generated the message m.

The data plane 36 of the network device 32 then inspects the source address of the message m to confirm that the unique port P1 that received the message m is connected to the private node 26 that generated the message. It is to be appreciated that since the message m is transmitted over the private communication system 20, no message authentication code is required. The data plane 36 of the network device 32 of the security proxy device 24 then transmits the message m to the private node 26 indicated by the destination address. Specifically, in the present example, the data plane 36 of the network device 32 of the security proxy device 24 transmits the message m to the unique port P2 of the network device 32, where the unique port P2 is in electronic communication with the private node N2,1. The private node N2,1 knows that the message m was sent by the private node N1,1 by inspecting the source address of the message m.

In another example, one of the public nodes 28 of the public communication system 22 transmits a message m to a private node 26 that is part of the private communication system 20. Specifically, in the present example, the public node N7,1 of the public communication system 22 transmits the message m including a message authentication code to the network device 32. The source address indicates that the public node N7,1 transmitted the message m and the destination address indicates the message m is intended for the private node N1,1. The receive key (not shown) corresponding to the public node N7,1 saved in the tamper-resistant memory of the private domain PR of the network device 32 verifies the message authentication code of the message m. Specifically, the receive key corresponding to the public node N7,1 verifies the message authentication code by confirming the identity of the sender indicated in a frame header of the message m matches the sender indicated by the message authentication code. The network device 32 then confirms that the source address of the message m indicates the correct public node 28 that generated the message m (the public node N7,1). The data plane 36 of the network device 32 of the security proxy device 24 then transmits the message m without the message authentication code to the private node 26 indicated by the destination address. Specifically, in the present example, the data plane 36 of the network device 32 of the security proxy device 24 transmits the message m to the unique port P1 of the network device 32, where the unique port P1 is in electronic communication with the private node N1,1.

In another example, one of the public nodes 28 of the public communication system 22 transmits a message m intended for another public node 28 that is part of the public communication system 22. Specifically, in the present example, the public node N6,1 of the public communication system 22 transmits the message m including a message authentication code to the network device 32. The source address indicates that the public node N6,1 transmitted the message m and the destination address indicates the message m is intended for the public node N7,1. In the present example, the public node N6,1 of the public communication system 22 transmits the message m to the public port P6 of the network device 32, where the destination address is the public node N7,1 of the public communication system 22.

The data plane 36 of the network device 32 of the security proxy device 24 transmits the message m to the public port P7, which is in electronic communication with the public node N7,1. The public node N7,1 verifies the message authentication code corresponding to the message m by the corresponding security module 42 and the receive key (not shown) corresponding to the public node N6,1. As mentioned above, the security module 42 and the receive key corresponding to the public node N6,1 are stored locally at the public node N7,1. Specifically, the receive key corresponding to the public node N6,1 verifies the message authentication code by confirming the identity of the sender indicated in a frame header of the message m matches the sender indicated by the message authentication code.

In another example, one of the public nodes 28 of the public communication system 22 transmits a message m to another one of the public nodes 28 that are part of the public communication system 22 based on the hop-by-hop routing approach where the message authentication code is verified by an intermediate node. One example of a hop-by-hop routing protocol is the Media Access Control security (MACsec) protocol. The remaining examples described above are based on an end-to-end routing approach where intermediate nodes do not verify the message authentication codes.

In the present example, one of the public nodes 28 of the public communication system 22 transmits a message m intended for another public node 28 that is part of the public communication system 22 based on the hop-by-hop routing approach. Specifically, the public node N6,1 of the public communication system 22 transmits the message m including a message authentication code to the network device 32. The source address indicates that the public node N6,1 transmitted the message m and the destination address indicates the message m is intended for the public node N7,1. The public node N6,1 of the public communication system 22 transmits the message m to the public port P6 of the network device 32, where the destination address is the public node N7,1 of the public communication system 22.

The network device 32 checks the source address of the message m and determines the message m was sent by the public node N6,1. Based on this, the network device 32 determines the receive key (not shown) corresponding to the public node N6,1 checks the authenticity of the message m. Using the receive key corresponding to the public node N6,1, the network device 32 checks the authenticity of the message m. The network device 32 then generates a new message authentication code for the message m by the public domain transmit key 50 that is part of the public domain PU of the network device 32. The network device 32 also creates a new frame header for the message m, where the frame header indicates the source address is the security proxy device 24 and the destination address is the public node N7,1. The data plane 36 of the network device 32 of the security proxy device 24 transmits the message m, which includes the new message authentication code, to the public port P7, which is in electronic communication with the public node N7,1. The public node N7,1 verifies the new message authentication code corresponding to the message m by the corresponding security module 42 and the receive key (not shown) corresponding to the public domain PU of the network device 32.

The message authentication system illustrated in FIG. 1 of the present disclosure provides various technical effects and benefits. Specifically, the processing unit of the security proxy device does not have a role in authenticating messages that are transmitted to the private communication system and the public communication system, which results in increased computational availability the processing unit and reduced latency for transmitting authenticated message. The message authentication codes generated or verified by the security proxy device are handled by the security module, which is embedded in the network device, instead of a security module located outside of the network device, which results in improved end-to-end latency. This also prevents a security-compromised processing unit from providing a misleading source address to the security module. The misleading source address indicates a message that was not generated by one of the private nodes is indeed generated by one or the private nodes.

Figure 2:
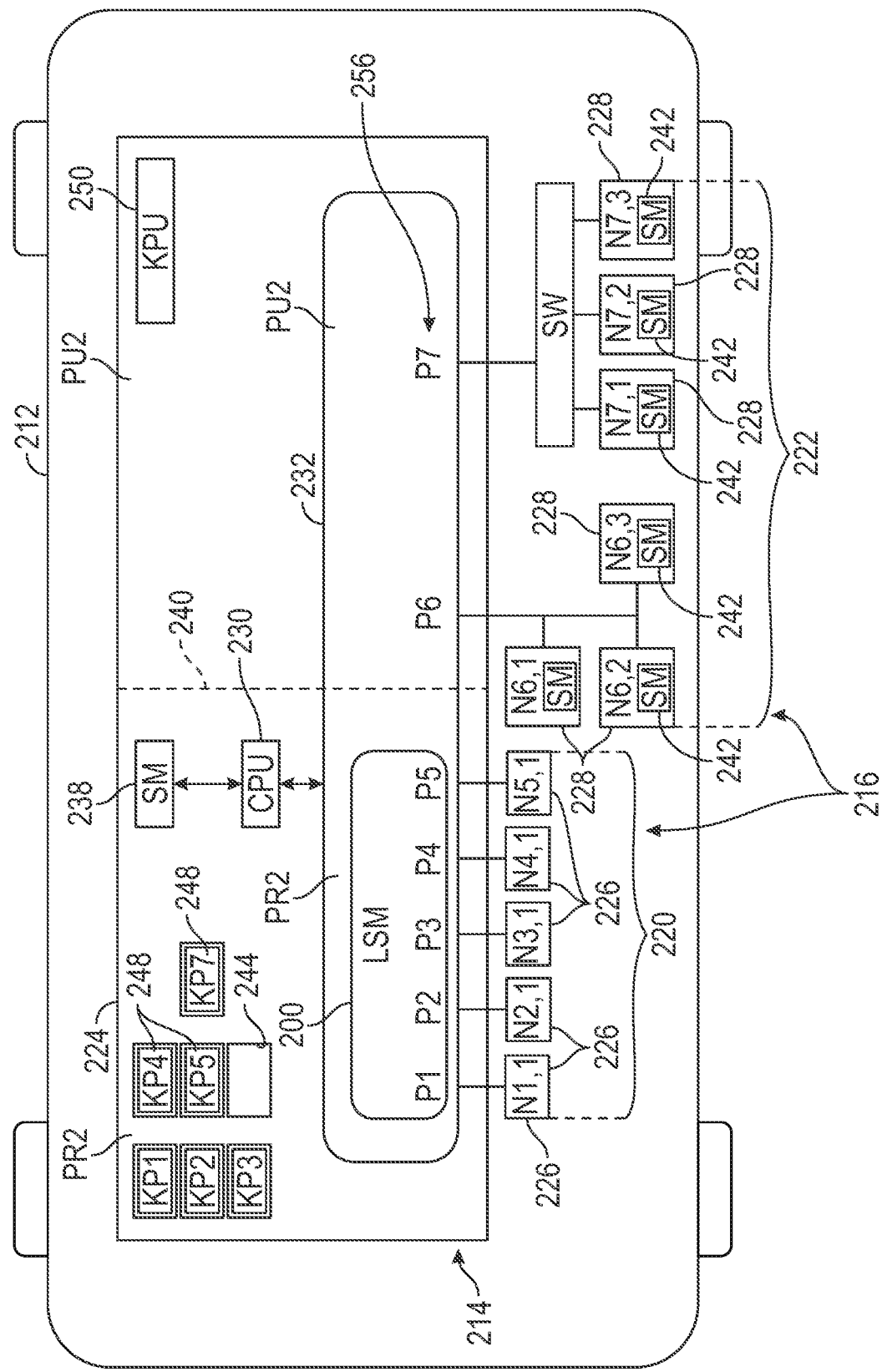
FIG. 2 is a schematic diagram of another embodiment of the message authentication system where the security proxy device includes a lightweight security module, according to an exemplary embodiment.

FIG. 2 illustrates another embodiment of a vehicle 212 including an exemplary message authentication system 214 for a network 216. The message authentication system 214 includes a private communication system 220 and a public communication system 222 in electronic communication with one another by a security proxy device 224. The security proxy device 224 includes a processing unit 230, a network device 232, and a security module 238, where the processing unit 230 is in electronic communication with both the network device 232 and the security module 238. Unlike the processing unit 30 shown in FIG. 1, the processing unit 230 of the security proxy device 224 receives messages generated by one of the private nodes 226 that are part of a private communication system 220 from the network device 232 and forwards the messages to the security module 238 of the security proxy device 224. The processing unit 230 of the security proxy device 224 also transmits messages received from the security module 238 to the one or more of the public nodes 228 that are part of the public communication system 222 as well. Like the embodiment as shown in FIG. 1, the private nodes 226 represent devices with limited computational power and lack support for message authentication, however, the public nodes 228 require message authentication and each include a corresponding security module 242.

Both the security proxy device 224 and the network device 232 include a private domain PR2 and a public domain PU2, where a virtual boundary 240 separates the private domain PR2 from the public domain PU2. The network device 232 of the security proxy device 224 includes a lightweight security module 200 and a plurality of ports 256. The lightweight security module 200 is in electronic communication with the one or more private nodes 226 of the private communication system 220 and is located within the private domain PR2 of the network device 232. The public domain PU2 of the network device 232 includes one or more public ports P6 and P7, where the public ports P6 and P7 are each in electronic communication with one or more of the public nodes 228 of the private communication system 220.

The lightweight security module 200 includes one or more unique ports 256, where each unique port 256 corresponds to one of the private nodes 226 of the private communication system 220. In the non-limiting embodiment as shown in FIG. 2, the private communication system 220 includes five private nodes N1,1, N1,2, N1,3, N1,4, N1,5. The private domain PR2 of the lightweight security module 200 includes a plurality of unique ports P1, P2, P3, P4, P5 that each correspond to one of the private nodes 226 of the private communication system 220. The lightweight security module 200 of the network device 232 of the security proxy device 224 knows which private node 226 generated a message since there is a one-to-one relationship between the private nodes 226 and the unique ports 256 of the lightweight security module 200, where each private node 226 that is part of the private communication system 220 is assigned to one of the unique ports 256 of the lightweight security module 200.

The lightweight security module 200 represents any device implemented in hardware or software that is configured to compute message authentication codes based on a single transmit key, such as the lightweight transmit key KLSM stored in the private domain PR2 of the security proxy device 224. That is, the functionality of the lightweight security module 200 is limited to computing message authentication codes and determining node identifiers for messages received from one of the private nodes 226 that are part of the private communication system 220. In other words, the functions of the lightweight security module 200 is limited to authenticating and adding node identifiers to messages received from one of the private nodes 226 of the private communication system 220 and is less complex than a security module that performs all the required cryptographic operations and enforces access control policies.

The private domain PR2 of the security proxy device 224 includes a plurality of transmit key slots 244, where each transmit key slot 244 is configured to store a corresponding transmit key 248. The number of transmit key slots 244 are equal to the number of potential private ports of the network device 232, where a plurality of transmit keys 248 stored in the private domain PR2 of the security proxy device 224 each correspond to one of the private nodes 226.

The private domain PR2 of the security proxy device 224 also stores the lightweight transmit key KLSM, which corresponds to the lightweight security module 200. In the embodiment as shown in FIG. 2, the private domain PR2 of the security proxy device 224 includes seven transmit key slots 244 to represent one of the potential private ports and the lightweight transmit key KLSM. Five of the key slots 244 store transmit keys KP1-KP5 that correspond to the private ports P1-P5, and a seventh key slot 244 stores the lightweight transmit key KLWM. The private domain PR2 of the security proxy device 224 also stores one or more of receive keys (not shown) as well, where each receive key corresponds to one of the public nodes 228 that are part of the public communication system 222. It is to be appreciated that the lightweight transmit key KLSM is inaccessible to the processing unit 230 of the security proxy device 224. Therefore, if the processing unit 230 is compromised, then an attacker is unable to access the lightweight transmit key KLSM and the transmit keys KP1-KP5 via the processing unit 230.

The public domain PU2 of the security proxy device 224 stores a public domain transmit key 250 labeled KPU that authenticates messages generated by the public nodes 228 that are transmitted over the network 216 based on the hop-by-hop routing approach. The tamper-resistant memory of the public domain PU of the network device 232 also includes receive keys (not shown) that correspond to the public nodes 228 as well. In one embodiment, the public domain PU stores receive keys corresponding to the public nodes N6,1, N6,2, N6,3, N7,1, N7,2, N7,3. However, as mentioned above, if one of the public nodes 228 never sends messages based on the hop-by-hop routing approach, then a corresponding receive key is not required.

Figure 3:
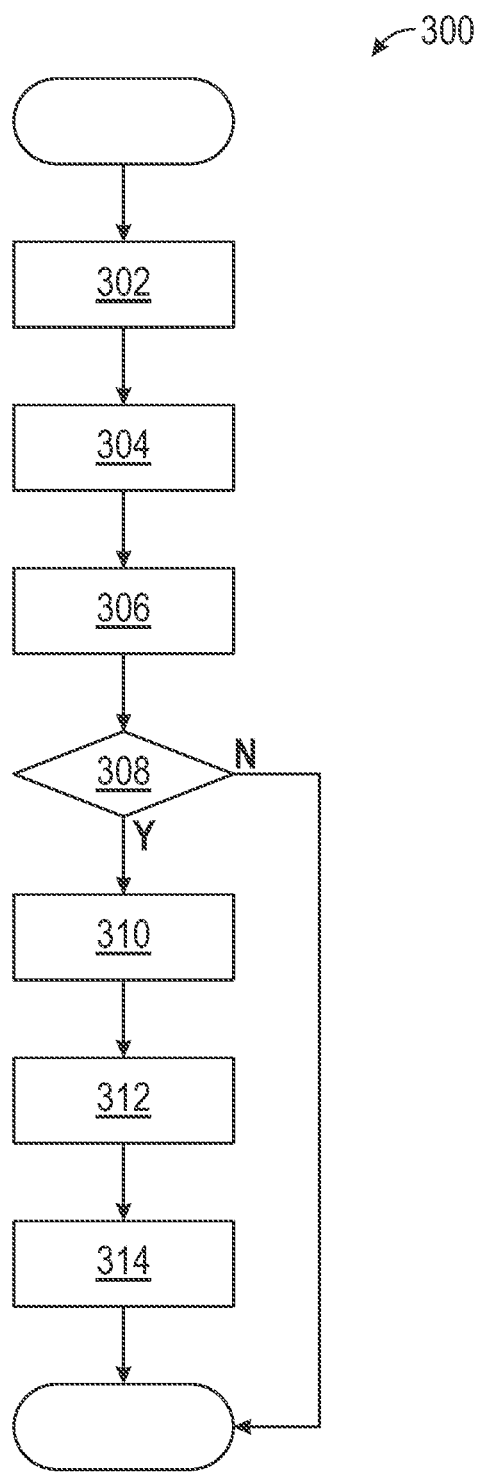
FIG. 3 is a process flow diagram illustrating a method for authenticating messages generated by one of the private nodes shown in FIG. 2 that are transmitted to one or more of the public nodes, according to an exemplary embodiment.

FIG. 3 is an exemplary process flow diagram illustrating a method 300 for transmitting messages generated by one of the private nodes 226 of the private communication system 220 to one or more of the public nodes 228 that are part of the public communication system 222. Referring to both FIGS. 2 and 3, the method 300 begins at block 302. In block 302, the lightweight security module 200 of the network device 232 of the security proxy device 224 receives an original message m generated by one of the private nodes 226 of the private communication system 220, where the original message m is intended for one or more of the public nodes 228 that are part of the public communication system 222. The method 300 may then proceed to block 304.

In block 304, the lightweight security module 200 of the network device 232 of the security proxy device 224 creates an updated message m' including a node identifier, a message authentication code, and the original message m. The node identifier indicates an identity of the private node 226 that the lightweight security module 200 received the original message m from. Specifically, the lightweight security module 200 and the lightweight transmit key KLSM that is part of the private domain PR2 of the security proxy device 224 generate a message authentication code for the updated message m'. The method 300 may then proceed to block 306.

In block 306, the processing unit 230 of the security proxy device 224 retrieves the updated message m' from the lightweight security module 200 and transmits the updated message m' to the security module 238 of the security proxy device 224. The method 300 may then proceed to decision block 308.

In decision block 308, the security module 238 of the security proxy device 224 and a corresponding receive key (not shown in FIG. 2) stored in the private domain PR2 of the security proxy device 224 verify the message authentication code of the updated message m'. In response to determining the message authentication code is not valid, the method 300 may terminate. However, in response to determining the message authentication code of the updated message m' is valid, the method 300 may proceed to block 310.

In block 310, the security module 238 of the security proxy device 224 and the corresponding transmit key 248 stored in the private domain PR2 of the security proxy device 224 create an updated message authentication code for the original message. Specifically, the security module 238 partitions the updated message m' into the node identifier and the original message m. The security module 238 then calculates the updated message authentication code for the original message by selecting one of the transmit keys 248 stored in the private domain PR2 of the security proxy device 224 that corresponds to the private node 226 indicated by the node identifier.

In block 312, the processing unit 230 of the security proxy device 224 receives the original message m including the updated message authentication code and transmits the original message m including the updated message authentication code to the network device 232. The method 300 may then proceed to block 314.

In block 314, the public domain PU2 of the network device 232 transmits the original message m, which includes the updated message authentication code, to one or more of the public nodes 228 indicated by the destination address indicated by the original message m via one or more of the public ports P6, P7. The method 300 may then terminate.

The disclosed message authentication system illustrated in FIGS. 2 and 3 provides various technical effects and benefits. Specifically, the processing unit of the security proxy device is unable to access the lightweight transmit key. Therefore, in the event of an attack, the processing unit is unable to create a misleading source address indicating a message that was not generated by one of the private nodes is indeed generated by one or the private nodes. The message authentication system also prevents private nodes from spoofing one another to the security proxy device as well.

The processing unit may refer to, or be part of an electronic circuit, a combinational logic circuit, a field programmable gate array (FPGA), a some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A message authentication system for a network, the message authentication system comprising:
   a private communication system including one or more private nodes in electronic communication with one another;
   a public communication system including one or more public nodes in electronic communication with one another, wherein the public nodes require message authentication; and
   a security proxy device that electronically connects the private communication system to the public communication system, wherein the security proxy device includes a processing unit in electronic communication with a network device, and wherein the network device includes:
      a security module integrated into the security proxy device;
      a private domain including one or more unique ports and storing one or more transmit keys for authenticating messages generated by one of the private nodes of the private communication system, wherein each unique port of the private domain corresponds to one of the private nodes of the private communication system; and
      a public domain including one or more public ports, wherein the one or more public ports of the public domain are in electronic communication with one or more of the public nodes of the public communication system.

2. The message authentication system of claim 1, wherein the private nodes lack support for message authentication.

3. The message authentication system of claim 1, wherein the security module and a corresponding transmit key of the private domain of the network device generate a message authentication code for a message generated by one of the private nodes of the private communication system that is sent to one or more of the public nodes.

4. The message authentication system of claim 1, wherein the private domain of the network device stores one or more receive keys, wherein each receive key corresponds to one of the public nodes.

5. The message authentication system of claim 4, wherein the security module and a corresponding receive key of the network device verify a message authentication code for an incoming message generated by one of the public nodes of the public communication system that is transmitted to one or more of the private nodes.

6. The message authentication system of claim 1, wherein the private domain of the network device stores a common transmit key that authenticates messages generated by any of the private nodes.

7. The message authentication system of claim 1, wherein each public node of the public communication system includes a corresponding security module.

8. The message authentication system of claim 7, wherein each public node of the public communication system includes a unique transmit key and receive keys, wherein the receive keys each correspond to one of the private nodes of the private communication system and the remaining public nodes that are part of the public communication system.

9. The message authentication system of claim 8, wherein the corresponding security module and the unique transmit key that are part of a specific public node generate a message authentication code for messages sent by the specific public node.

10. The message authentication system of claim 9, wherein the corresponding security module and a corresponding receive key that is part of the specific public node verifies message authentication codes for messages received by the specific public node.

11. The message authentication system of claim 1, wherein the private nodes include one or more of the following: smart sensors, smart actuators, and electronic control units with input/output (I/O) interfaces that are part of a vehicle.

12. The message authentication system of claim 1, wherein the public domain of the network device stores a public domain transmit key that authenticates messages generated by the public nodes that are transmitted over the network based on a hop-by-hop routing approach.

13. A message authentication system for a network, the message authentication system comprising:
   a private communication system including one or more private nodes in electronic communication with one another;
   a public communication system including one or more public nodes in electronic communication with one another, wherein the public nodes require message authentication, and wherein each public node of the public communication system includes a corresponding security module; and
   a security proxy device that electronically connects the private communication system to the public communication system, wherein the security proxy device includes a processing unit in electronic communication with a network device, and wherein the network device includes:
      a security module integrated into the security proxy device;
      a private domain including one or more unique ports and storing one or more transmit keys for authenticating messages generated by one of the private nodes of the private communication system, wherein each unique port of the private domain corresponds to one of the private nodes of the private communication system, wherein the security module and a corresponding transmit key stored by the private domain of the network device generate a message authentication code for a message generated by one of the private nodes of the private communication system that is sent to one or more of the public nodes; and a public domain including one or more public ports, wherein the one or more public ports of the public domain are in electronic communication with one or more of the public nodes of the public communication system.

14. The message authentication system of claim 13, wherein the private domain of the network device stores one or more receive keys, wherein each receive key corresponds to one of the public nodes.

15. The message authentication system of claim 14, wherein the security module and a corresponding receive key of the network device verify a message authentication code for an incoming message generated by one of the public nodes of the public communication system that is transmitted to one or more of the private nodes.

16. The message authentication system of claim 13, wherein the private domain of the network device stores a common transmit key that authenticates messages generated by any of the private nodes.

17. The message authentication system of claim 13, wherein each public node of the public communication system includes a corresponding security module.

18. The message authentication system of claim 17, wherein each public node of the public communication system includes a unique transmit key and receive keys, wherein the receive keys each correspond to one of the private nodes of the private communication system and the remaining public nodes that are part of the public communication system.

19. The message authentication system of claim 18, wherein the corresponding security module and the unique transmit key that are part of a specific public node generate a message authentication code for messages sent by the specific public node.

20. A message authentication system for a network, the message authentication system comprising:

a private communication system including one or more private nodes in electronic communication with one another;

a public communication system including one or more public nodes in electronic communication with one another, wherein the public nodes require message authentication, and wherein each public node of the public communication system includes a corresponding security module; and a security proxy device that electronically connects the private communication system to the public communication system, wherein the security proxy device includes a processing unit in electronic communication with a network device, and wherein the network device includes:

a security module integrated into the security proxy device;

a private domain including one or more unique ports and storing one or more transmit keys for authenticating messages generated by one of the private nodes of the private communication system, wherein each unique port of the private domain corresponds to one of the private nodes of the private communication system, wherein the security module and a corresponding transmit key stored by the private domain of the network device generate a message authentication code for a message generated by one of the private nodes of the private communication system that is sent to one or more of the public nodes; and a public domain including one or more public ports and storing one or more receive keys that correspond to one of the public nodes, wherein the one or more public ports of the public domain are in electronic communication with one or more of the public nodes of the public communication system, wherein the security module and a corresponding receive key of the network device verify a message authentication code for an incoming message generated by one of the public nodes of the public communication system that is transmitted to one or more of the private nodes.

* * * * *